Nov. 13, 1934.   W. F. GERHARDT ET AL   1,980,195
WIND TUNNEL BALANCE
Filed July 24, 1930   2 Sheets-Sheet 1

INVENTORS
WILLIAM F. GERHARDT and
BY C. A. BROCK
ATTORNEY

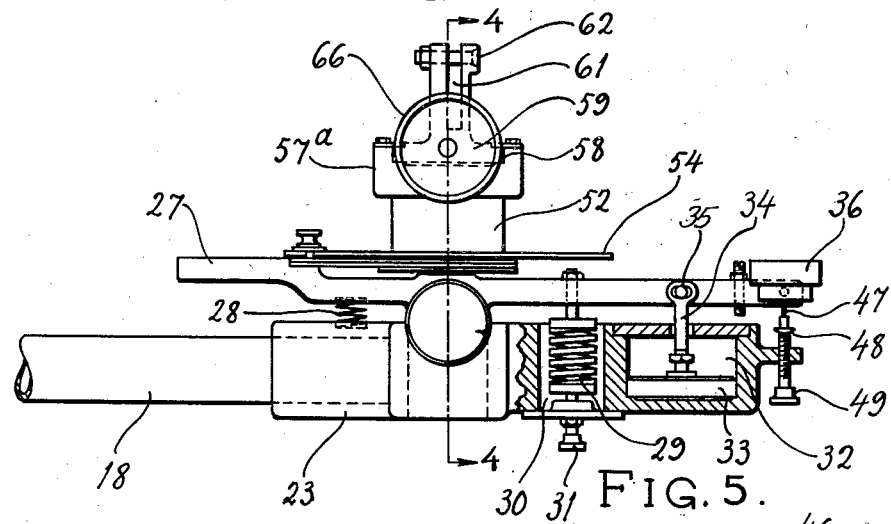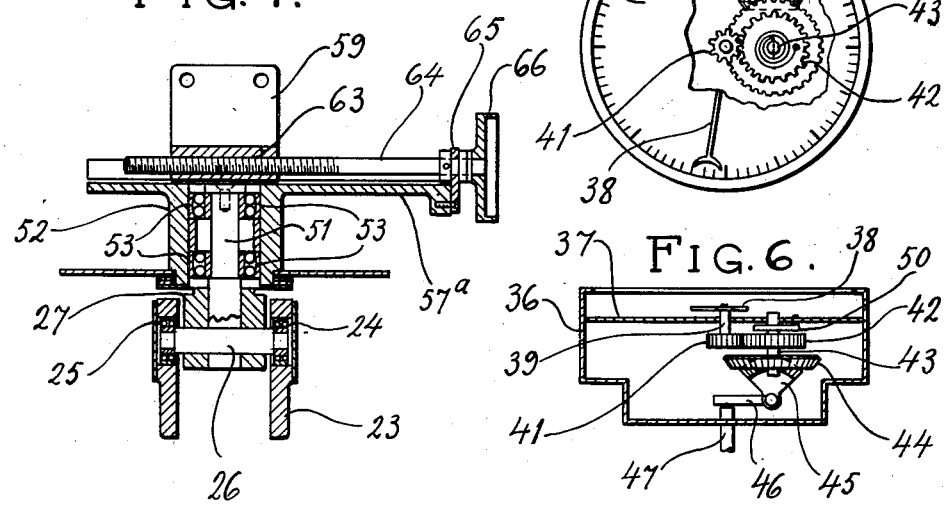

Patented Nov. 13, 1934

1,980,195

UNITED STATES PATENT OFFICE 1,980,195

WIND TUNNEL BALANCE

William F. Gerhardt, Grosse Ile, and Clarence A. Brock, Detroit, Mich., assignors, by mesne assignments, to Devon Corporation, a corporation of Delaware Application July 24, 1930, Serial No. 470,368

18 Claims. (Cl. 265—23)

This invention relates to wind tunnel balance and more particularly to an airfoil mounting to be used in connection with a wind tunnel for testing and demonstrating the aerodynamic characteristics of airfoils.

Prior to my invention there have been in general use for such purposes, two types of airfoil mountings. The first of these is the N. P. L. or spindle balance in which the airfoil is mounted vertically within a wind tunnel at the top of a vertical spindle. The spindle is mounted on a pivot for universal movement and is provided with a pair of horizontal arms arranged below the tunnel, one extending substantially parallel to the direction of the wind stream and the other substantially perpendicular thereto. Thus forces tending to move the airfoil in the direction of the wind stream may be measured by weights on a pan on the first of the arms and forces tending to move the airfoil perpendicular to the wind stream may be measured by weights placed upon a pan on the other arm. The second type of balance in ordinary use is the wire balance. Therein the airfoil is inverted and mounted horizontally within the tunnel. A pair of wires are connected to the leading edge, extend substantially vertically upward and are connected to one end of a balance arm by which forces acting vertically downward upon the airfoil at the leading edge thereof may be measured. A slender rod is attached to the trailing edge and a wire extending vertically upward from the rod is attached to another balance arm by which a force proportional to the force acting vertically downward upon the airfoil at the trailing edge may be measured. Another pair of wires is attached to the leading edge of the airfoil and extend forward therefrom, around pulleys and upward, and are attached to a third balance arm by which the forces acting in the direction of the air flow may be measured. In both types of balance, it is necessary that at least two balance arms be adjusted and the forces acting thereon be measured in order that the resultant force or the lift and drag forces may be obtained. Moreover, it is necessary that the value of at least a third force be found in order to discover the center of pressure.

One of the objects of this invention is to provide apparatus capable of measuring the several forces acting upon an airfoil simultaneously.

A further object of the invention is to provide apparatus capable of measuring both lift and drag simultaneously with one weighing operation.

A further object of the invention is to provide apparatus capable of measuring the total force acting upon an airfoil regardless of the lift and drag thereof and of defining the direction of application of this total force whereupon the component forces (acting not only as lift and drag but in any specified directions) may be easily resolved from the total force.

A further object of the invention is to provide apparatus capable of determining the center of pressure simultaneously with the measurement of the resultant force; that is, apparatus capable of finding exactly the point of application of the resultant force.

A further object of the invention is to provide a simple, inexpensive and light weight apparatus for measuring forces and testing and demonstrating characteristics of airfoils.

A further object of the invention is to provide an apparatus especially adapted for use in instruction of aerodynamic theory.

Further objects will be apparent from a reading of the subjoined specification and claims and from a consideration of the accompanying drawings.

In order to explain the invention more clearly, one embodiment thereof is shown in said drawings, in which:

Fig. 3 is an enlarged view in elevation of the airfoil balance shown in Fig. 1 with further parts broken away;

Fig. 4 is a view in vertical section of the airfoil balance shown in Fig. 3 taken on the line 4—4 thereof;

Fig. 5 is an enlarged plan view of an indicator dial forming a part of the airfoil balance; and Fig. 6 is a view in vertical section of the indicator apparatus shown in Fig. 5.

Figure 1:
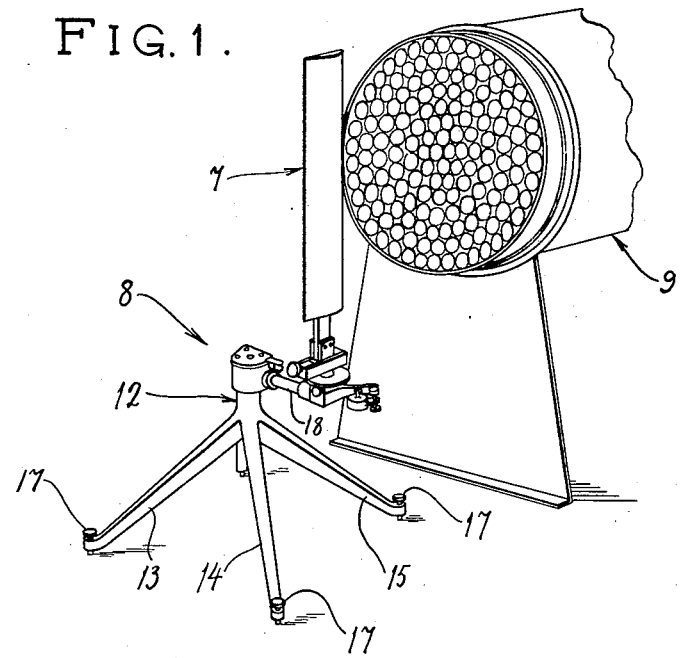
Fig. 1 is a perspective view of my improved airfoil balance, an airfoil carried thereby, and a wind tunnel positioned adjacent thereto.

Referring in detail to the drawings, wherein like reference numerals are used to indicate the same or similar parts, I have shown an airfoil 7 mounted upon an airfoil balance generally designated 8 and positioned adjacent to a wind tunnel generally designated 9. The balance 8 includes a pedestal mount generally designated 12 provided with four legs such as the legs 13, 14, 15 and 16. Each of these legs is provided with an adjusting screw 17 by which the pedestal mount and airfoil balance may be leveled.

In order that the direction of the resultant force acting upon the airfoil may be readily obtained, I mount the airfoil at the end of an arm 18 which is pivotally mounted upon the pedestal 12. The arm 18 is mounted for free rotation about the center 19, as in ball bearings. The arm 18 is provided with a pointer 21 which moves over the face of an arcuate plate 22 to cooperate with the plate and indicate the angle which the arm 18 makes with the wind stream. A thumb screw 20 is provided for releasably maintaining the arm 18 in any desired position. Inasmuch as the arm is arranged normally to freely rotate, and inasmuch as the pedestal may be leveled exactly by means of the adjusting screws 17, the airfoil automatically moves or rotates about its axis under the influence of the air stream, to a position in which the force tending to move the airfoil along the wind stream is balanced by the force tending to move the airfoil perpendicularly to the wind stream. In other words, the airfoil automatically takes a position in which the arm 18 is pointing in the direction of the resultant force acting on the airfoil. Thus the tangent of the angle made by the arm 18 with the wind stream equals the lift divided by the drag and the angle indicated on the dial 22 is the angle whose tangent is the efficiency of the airfoil tested.

Means are provided for measuring the amount of the resultant force acting upon the airfoil. As shown more clearly in Figs. 3 and 4 the arm 18 carries an extension 23 within which is mounted in the ball bearings 24 and 25 an axle 26 for the scale balance arm 27. The axle 26 extends horizontally perpendicular to the arm 18 so that the scale balance arm 27 is pivoted to rotate about a horizontal axis perpendicular to the arm 18 and therefore normally also perpendicular to the direction of the resultant force. The arm 27 is resiliently urged in one direction by a spring 28 interposed between the arm 27 and the extension 23 and in the other direction by an adjustable spring 29 also interposed between the arm 27 and the extension 23. The spring 29 is positioned for the greater part in a well 30 and is of much greater strength than the spring 28. It is provided with an adjusting screw 31 by which the tension thereof may be changed in order to adjust the force measuring characteristics of the scale arm. Another well 32 is also provided in the extension 23 and a plunger 33 positioned within the well 32 carries a stem 34 which is attached to the balance arm 27 by a pin and slot connection at 35. The well 32 may be filled with oil and thus a dashpot is formed for cushioning the movement of the balance arm. The movement of the arm 27 about its pivot in opposition to the spring 29 is in the plane of the axis of the arm 18 and in the plane of the resultant force. The amount of movement of the arm, therefore, bears a definite relation to the resultant force acting on the airfoil 10.

I also provide means for indicating the amount of the resultant force. This means consists of an indicator registering the amount of angular movement of the scale arm 27 and consequently the amount of compression of the spring 29 and the total amount of the force acting on the airfoil. The indicator includes, as shown in Figs. 3, 5 and 6 an indicator casing 36 provided with a dial 37 about which a pointer 38 is adapted to turn. The pointer 38 is mounted on a stub shaft 39 provided with a gear wheel 41 which meshes with a larger gear wheel 42 mounted upon a second stub shaft 43. The stub shaft 43 also carries a bevel gear 44 which meshes with a sector bevel 45 actuated by an offset arm 46. The arm 46 is actuated by a follower 47 having a semi-spherical bottom head 48 (see Fig. 3). The head 48 is held in contact with an adjustable screw 49 by means of a spiral spring 50 which acts continuously to urge the shaft 43 in a counter-clockwise direction (as seen in Fig. 5). Thus, movement of the scale arm 27 relative to the extension 23 causes movement of the pointer 38 to indicate the amount of resultant force acting on the airfoil. By means of the screw 49 the pointer 38 may be adjusted to the zero indication to correspond to the condition when no air force is acting on the airfoil. The dial 37 may be calibrated directly in weight units, the calibration being based on the weight required per unit of deflection in the springs 28 and 29.

Figure 2:
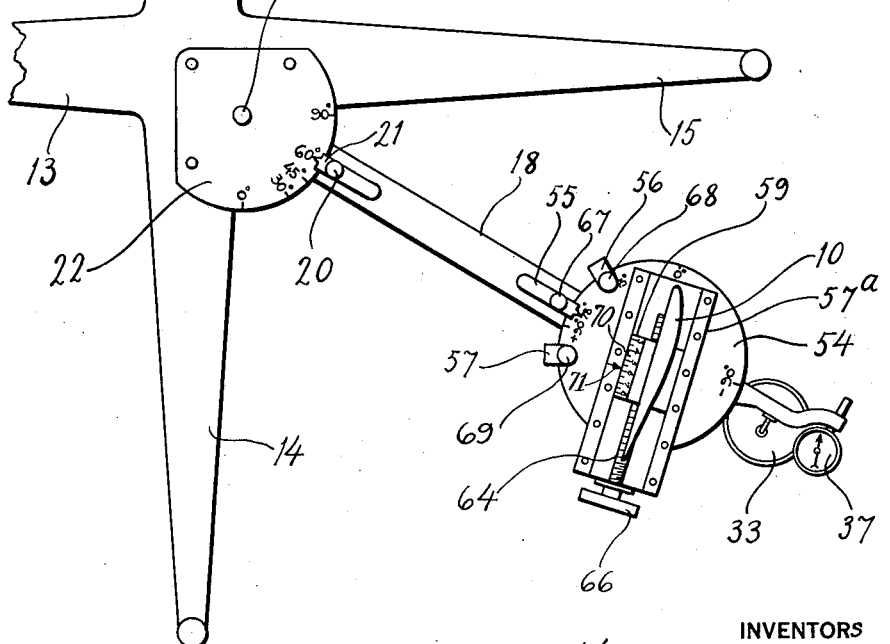
Fig. 2 is a plan view of the airfoil balance shown in Fig. 1 with parts of the pedestal broken away.

Means are also provided to adjust the airfoil to different angles of attack in order that it may be tested at said different angles. As shown in Fig. 4, the balance arm 27 carries a spindle 51 upon which a sleeve 52 is mounted for rotation about the substantially vertical axis of the spindle. Ball bearings 53 may be provided to insure free rotation. The sleeve 52 adjacent to its lower end carries a plate 54 upon which are indicated angles which the airfoil makes with the direction of the resultant air force. As shown in Fig. 2, pointer 55, secured to the arm 18, cooperates with these indications to enable the operator to read these angles easily. Stops 56 and 57 are adjustably secured to the plate 54 to cooperate with the pointer 55 for purposes later to be described.

Means are also provided for simultaneously finding the center of pressure of the airfoil being tested. The upper part of the sleeve 52 is provided with a horizontal extension 57ᵃ. As shown more clearly in Fig. 3 the extension 57ᵃ is provided with a groove 58 in which a slide 59 is adapted to move. The slide 59 is provided with a groove 61 and a bolt 62 by means of which the airfoil 10 may be firmly secured thereto. The slide 59, as shown more clearly in Fig. 4, is further provided with an internally threaded recess 63 in which a screw 64 is adapted to be threaded. The screw 64 is held against movement of translation relative to the extension 57ᵃ by means of a plate 65 fastened to the extension 57ᵃ and is provided with a hand wheel 66 by means of which the screw may be turned and the slide 59 caused to translate within the groove 58. Thus, the airfoil 10 may be moved forward or backward relative to the arm 18. If the center of pressure of the airfoil 10 is forward of the axis of the arm 18, the air forces acting thereon will tend to turn the airfoil 10 in a clockwise direction as shown in Fig. 2. If, however, the center of pressure of the airfoil 10 is back of the axis of the arm 18 the air forces will tend to turn the airfoil in a counter-clockwise direction as shown in Fig. 2. This movement of rotation of the airfoil 10 will be limited by contact of the pointer 55 with one of the stops 56 or 57. By observation as to which stop the indicator contacts with, it may be determined whether the airfoil is mounted with its center of pressure ahead of or behind the axis of the arm 18, and by adjustment of the screw 64 by means of the wheel 66 the airfoil may be moved to such a position that the pointer 55 is maintained intermediate or continuously oscillating between the stops 56 and 57. Thereupon the center of pressure of the airfoil 10 coincides with the axis of the arm 18. By means of an indicating scale 70, calibrated in percentage of chord of the airfoil 10, said scale being carried by the slide 59, and an index 71 carried by the extension 57ª, the center of pressure of the airfoil may be directly read. It will be seen that the index 71 will indicate a certain percentage of chord for any certain setting of the screw 64, and when the airfoil balances or oscillates freely between the stops 56 and 57 as above described, the indication on the scale 70 shows the true center of pressure position for that series of circumstances in which the whole device is in balance. A thumb screw 67 is provided for use when desired to hold the sleeve 52 and plate 54 adjustably in any selected angular position relative to the arm 18. Thumb screws 68 and 69 are provided for adjustably holding the stops 56 and 57 in any selected position on the periphery of the plate 54.

In the operation of my improved testing apparatus an airfoil is secured in the groove 61 and is set at any desired angle relative to the arm 18, the screw 67 being screwed down in order to maintain the airfoil at said angle. Thereafter, the propeller fan of the wind tunnel is turned on and the airfoil, the sleeve 52 and the arm 18 are allowed to move to a position to which they are urged by the air force. The angle which the arm 18 makes with the wind stream is then read from the plate 22 and the amount of the resultant force is read directly from the indicator dial 37. The angle indicated on plate 22 is the efficiency angle and its tangent equals the lift/drag ratio. The screw 20 is then screwed down to maintain the arm in this position. The stops 56 and 57 are moved adjacent to the pointer 55 but not contacting therewith and the screw 67 is thereupon loosened. Dependent upon the direction which the airfoil tends to turn, the screw 64 is then rotated until the airfoil 10 is balanced, and the center of pressure position is read. The angle of attack of the airfoil is obtained by subtracting the angle indicated on the plate 22 from the angle indicated on the plate 54. The lift and drag are easily computed inasmuch as the sine of the angle indicated on the plate 22 equals the lift divided by the resultant force and the cosine equals the drag divided by the resultant force. This process is repeated for different settings of the airfoil relative to the arm 18 until values for the resultant force, the lift/drag ratio, the lift, the drag and the center of pressure for all angles of attack within the flying range are obtained. Of course, if desired, values for angles outside of the flying range may also be obtained.

I claim as my invention:

1. In apparatus for determining the characteristics of airfoils, a mount for an airfoil comprising a support, an arm having a substantially vertical axis of rotation rotatably mounted upon said support, a scale beam rotatably mounted at the outer end of said arm, and means for securing an airfoil to said scale beam.

2. In apparatus for determining the characteristics of airfoils, a mounting for an airfoil comprising a support and an arm, means for rotatably mounting said arm on said support, a scale beam, means for rotatably mounting said beam on a substantially horizontal axis at the outer end of said arm, a bracket to which the airfoil may be secured, and means for rotatably mounting said bracket on a substantially vertical pivot carried by said beam.

3. In apparatus for determining the characteristics of airfoils, a mount for an airfoil comprising a support, an arm rotatably mounted upon said support, a scale beam rotatably mounted at the outer end of said arm, a sleeve rotatably mounted upon said scale beam, and a bracket slidably mounted upon said sleeve.

4. In wind tunnel apparatus for determining the characteristics of airfoils, a support, an arm rotatably mounted on said support, an element, means for rotatably mounting said element upon said arm, a bracket slidably mounted in said element, means for firmly securing an airfoil to said bracket, and means for moving said bracket slidably in said element to a position in which the air pressures acting on said airfoil on opposite sides of the axis of rotation of said element are balanced whereby the center of pressure of the airfoil is brought to coincide with the axis of rotation of said element.

5. In wind tunnel apparatus for determining the characteristics of airfoils, a support, an arm rotatably mounted on said support, an element, means for rotatably mounting said element upon said arm, a bracket slidably mounted in said element, means for firmly securing an airfoil to said bracket, and stops provided to limit the amount of rotational movement of said element.

6. In wind tunnel apparatus for determining the characteristics of airfoils, a support, an arm rotatably mounted upon said support, means adapted to rotatably carry an airfoil at the outer end of said arm, means for releasably holding said rotatable arm in a selected angular position relative to the support, and means for releasably holding the airfoil in a selected angular position relative to the arm.

7. In wind tunnel apparatus for determining the characteristics of airfoils, a support, an arm rotatably mounted on said support, a scale beam pivotally mounted upon said arm, and means on said beam adapted to carry an airfoil, said scale beam pivot being perpendicular to said arm and to the axis of said arm pivot.

8. In wind tunnel apparatus for determining the characteristics of airfoils, a support, an arm pivotally mounted on said support, means for holding the airfoil to said arm in various positions of adjustment, and means at said arm pivot for use in determining the angle of attack of said airfoil.

9. In wind tunnel apparatus for determining the characteristics of airfoils, a support, an arm pivotally mounted on said support, means for holding the airfoil in various positions of adjustment relative to said arm, and means at said arm pivot for directly indicating the direction of the total resultant force acting on said airfoil.

10. In wind tunnel apparatus for determining the characteristics of airfoils, a support, an arm mounted on said support for angular adjustment with respect thereto, a force measuring device mounted on said arm and adapted to measure forces acting along the axis thereof, and means for mounting an airfoil on said device, said device including means to indicate the force acting on said airfoil and parallel to said arm axis.

11. In wind tunnel apparatus for determining the characteristics of airfoils, a support, an arm rotatably mounted on said support, means for mounting the airfoil at an end of said arm, and means cooperating with said airfoil mounting means for indicating the center of pressure of forces acting on said airfoil.

12. In wind tunnel apparatus for determining the characteristics of airfoils, a support, an arm mounted on said support for angular adjustment with respect thereto, a force measuring device mounted on said arm and adapted to measure forces acting along the axis thereof, means for mounting an airfoil on said device, said device including means to indicate the force acting on said airfoil and parallel to said arm axis, said mounting means including mechanism for adjusting said airfoil in different angular positions on said device.

13. In apparatus for measuring the characteristics of airfoils, means for mounting an airfoil in an air stream to assume a position of equilibrium, said means including means for shifting said airfoil chordwise for bringing it to a balanced equilibrium position wherein the resultant of the air forces on said airfoil acts through the center of pressure thereof, said last named means including indicia for indicating that point on the airfoil chord at which said resultant is acting when said airfoil is moved chordwise to an equilibrium position.

14. In apparatus for measuring the characteristics of airfoils, means for mounting an airfoil in an air stream to assume a position of equilibrium, said mounting means including a device for indicating the resultant of all air forces acting upon said airfoil, and means for indicating the direction of action of said resultant upon said airfoil reaching equilibrium.

15. In apparatus for measuring the characteristics of airfoils, means for movably mounting said airfoil in an air stream, said means including a device for indicating the resultant of all the air forces acting upon said airfoil when said airfoil is in equilibrium, means for moving said airfoil chordwise for bringing it to a position wherein said resultant acts through the airfoil center of pressure, said last named means including a device for indicating the position of said center of pressure, and means for indicating the direction of action of said resultant upon said airfoil reaching an equilibrium condition.

16. In apparatus for measuring the characteristics of airfoils, a support for movably mounting said airfoil in an air stream to reach an equilibrium position, a holding device for said airfoil adjustably movable relative to said support in a direction parallel to the airfoil chord, said support being at times freely oscillatable whereby, upon proper chordwise adjustment of said airfoil to an equilibrium condition as indicated by a cessation of oscillation of said airfoil on said support, the center of pressure of the resultant of all air forces on said airfoil is indicated by the position of said holding device relative to said support.

17. In apparatus for determining the characteristics of airfoils, means for supporting an airfoil in an air stream to assume a position of equilibrium, said means including a device for pre-setting the center of pressure of the resultant air forces acting upon said airfoil, and means operative upon said airfoil reaching an equilibrium position for determining the direction of action of said resultant and the angle of attack of said airfoil.

18. In apparatus for determining the characteristics of airfoils, means for supporting an airfoil in an air stream to assume a position of equilibrium, said means including a device for pre-setting the angle of attack of said airfoil, and means operative to adjust said airfoil in a plane parallel to the airfoil chord for bringing said airfoil into equilibrium, whereby, by the last named adjustment of said airfoil, the center of pressure of the resultant of all air forces acting on said airfoil may be determined.

WILLIAM F. GERHARDT.
CLARENCE A. BROCK.